(12) United States Patent  
Fujinaga (10) Patent No.: US 6,480,310 B1
(45) Date of Patent: Nov. 12, 2002

(54) PDS STRUCTURED OPTICAL SUBSCRIBER SYSTEM

(75) Inventor: Takashi Fujinaga, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/195,209

(22) Filed: Nov. 18, 1998

(30) Foreign Application Priority Data

Nov. 21, 1997 (JP) .............................................. 9-321190

(51) Int. Cl.⁷ .............................................. H04B 10/20
(52) U.S. Cl. ........................ 359/121; 359/125; 359/140; 359/135; 359/137; 370/252; 370/519; 370/468; 370/458
(58) Field of Search ................................. 359/121, 125, 359/140, 135, 137; 370/252, 519, 468, 458

(56) References Cited

U.S. PATENT DOCUMENTS

| | | | | |
|---|---|---|---|---|
| 5,212,534 A | * | 5/1993 | Bianchi et al. ................. 356/5 |
| 5,299,044 A | * | 3/1994 | Mosch et al. ................ 359/110 |
| 5,327,277 A | * | 7/1994 | Van Der Plas et al. ..... 359/140 |
| 5,537,241 A | * | 7/1996 | Fisher ......................... 359/137 |
| 5,550,807 A | * | 8/1996 | Kuroshita .................... 370/17 |
| 5,715,074 A | * | 2/1998 | Netsu ......................... 359/110 |
| 5,760,941 A | * | 6/1998 | Young et al. ............... 359/181 |
| 5,808,766 A | * | 9/1998 | Van de Voorde et al. ... 359/140 |
| 5,930,018 A | * | 7/1999 | Effenberger ................ 359/158 |

FOREIGN PATENT DOCUMENTS

| | | |
|---|---|---|
| JP | 5-191358 | 7/1993 |
| JP | 6-120969 | 4/1994 |

* cited by examiner

Primary Examiner—Leslie Pascal
Assistant Examiner—Hanh Phan
(74) Attorney, Agent, or Firm—Whitham, Curtis & Christofferson, P.C.

(57) ABSTRACT

An optical subscriber unit comprises a portion for detecting whether or not an installation distance of the optical subscriber unit is a short distance or a long distance when the optical subscriber unit receives a subscriber command from a center unit by referring to a received optical power, and a portion for transmitting response burst signal to an entrance use slot of the current frame when the installation distance is the short distance and to an entrance use slot of the next frame when the installation distance is the long distance. The center unit comprises a response burst signal detecting portion for detecting whether or not the response burst signal of the optical subscriber unit against the subscriber command in the current entrance use slot is present in the current entrance use slot, and an installation distance detecting portion for measuring a delay time period of the response burst signal of the optical subscriber unit against the subscriber command in the current entrance use slot so as to obtain the installation distance of the subscriber unit.

7 Claims, 5 Drawing Sheets

DOWNBOUND (CENTER → SUBSCRIBER) FRAME FORMAT

FIG. 2B

UPBOUND (SUBSCRIBER → CENTER) FRAME FORMAT

FIG. 4

FIG.5A  DOWNBOUND (CENTER → SUBSCRIBER) FRAME FORMAT

FIG.5B  UPBOUND (SUBSCRIBER → CENTER) FRAME FORMAT

PDS STRUCTURED OPTICAL SUBSCRIBER SYSTEM

BACKGROUND OF THE INVENTION

1. Field of the Invention

The present invention relates to a PDS (Passive Double Star) structured optical subscriber system and in particular, to a PDS structured optical subscriber system in which the length of an entrance use slot is halved.

2. Description of the Prior Art

Figure 4:
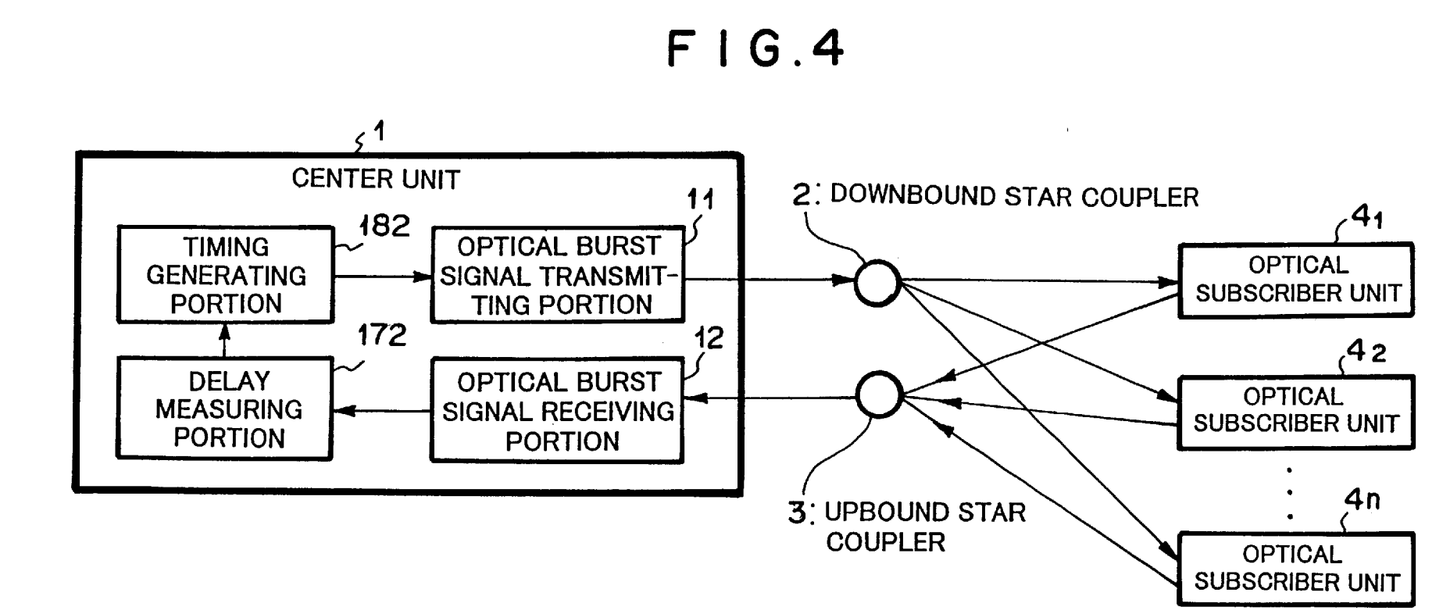
FIG. 4 is a block diagram showing the structure of a conventional PDS structured optical transmission system.

As shown in FIG. 4, in a PDS structured optical subscriber system, an optical output signal of optical burst signal transmitting portion 11 of center unit 1 is branched to N signals, wherein N is any integer larger than 0, by an optical branching/coupling unit (hereinafter referred to as star coupler 2). The branched optical signals are inputted to optical subscriber units $4_1$ to $4_n$. Optical output signals of optical subscriber units $4_1$ to $4_n$ are coupled by star coupler 3. The coupled optical signal is inputted to optical burst signal receiving portion 12 of center unit 1.

Figure 5A:
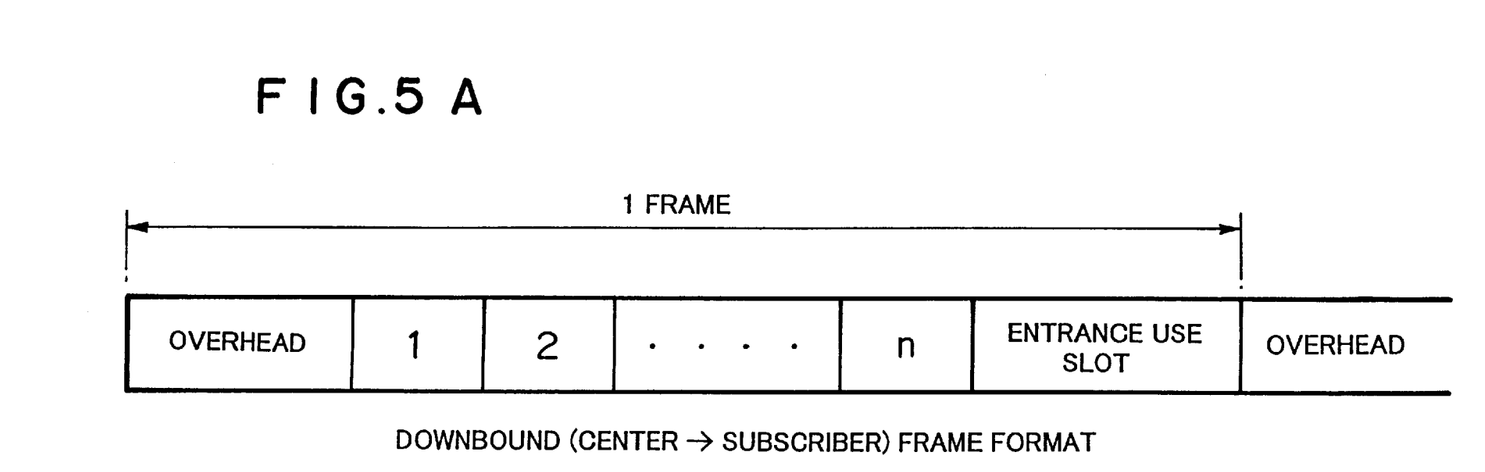
FIGS. 5A and 5B are schematic diagrams showing frame formats of the conventional PDS structured optical transmission system.
Figure 5B:
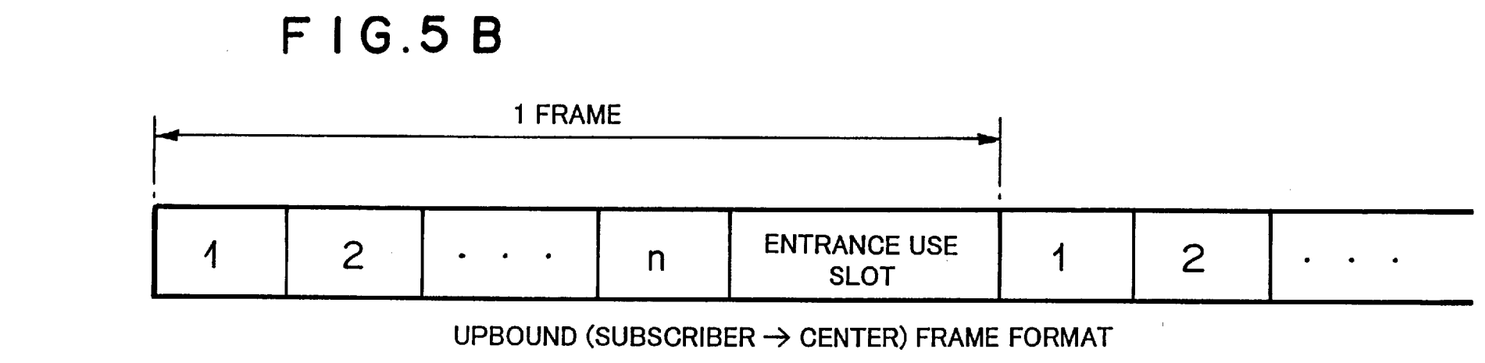

FIGS. 5A and 5B show frame formats used in the PDS structured optical subscriber system. In FIGS. 5A and 5B, the length of each frame is fixed, in which each frame has slots corresponding to optical subscribers and an entrance use slot. As shown in FIG. 5A, in a downbound frame, an overhead is added. Each optical subscriber unit receives only data of a slot assigned thereto from among slot 1 to slot n of a downbound frame format. In addition, each optical subscriber unit transmits data to a slot assigned to itself among slot 1 to slot n of an upbound frame format. Although the upbound frame format is formed by star coupler 3, the delay time period of an optical signal from transmission at each optical subscriber unit 4 to arrival at star coupler 3 is different from one another since a distance between unit 4 and star coupler 3 is different from one another. Thus, each optical subscriber unit 4 needs to adjust the output timing of data to the relevant slot. When each optical subscriber unit 4 newly subscribes to the system, center unit 1 assigns the output timing to optical subscriber unit 4.

Center unit 1 places burst signal at the beginning of the entrance use slot of the downbound frame format. When optical subscriber unit $4_m$ ($1 \leq m \leq n$) that newly subscribes to the system receives the burst signal, it sends the burst signal back to center unit 1. When center unit 1 receives the burst signal from optical subscriber unit $4_m$, delay measuring portion 182 of center unit 1 measures the turnaround delay time period of the burst signal in the entrance use slot. Timing generating portion 182 of center unit 1 calculates the response timing for output data of optical subscriber unit $4_m$ corresponding to the measured delay time period. The response timing data is placed in the entrance use slot of the downbound frame format. After receiving the response timing data, optical subscriber unit $4_m$ transmits data to center unit 1 keeping the timing corresponding to the response timing data.

In the above-explained prior art, when an optical subscriber unit newly subscribes to the system, the downbound frame format and the upbound frame format have respective entrance use slots as shown in FIGS. 5A and 5B so as to prevent initial response burst signal of a new subscriber unit from colliding with service data of other optical subscriber units that have subscribed to the system. Since the delay time period of initial return optical burst signal of the optical subscriber unit 4m is not controlled by the center unit 1, the position of the initial return optical burst signal in the upbound frame format is indefinite. Thus, the entrance use slot needs to have a length corresponding to the delay time period spent in an maximum allowable installation distance between center unit 1 and each optical subscriber unit.

Consequently, when the maximum allowable installation distance becomes large, the length of the entrance use slot becomes long. In other words, the length of service data in the frame format becomes short. Assuming that the maximum allowable installation distance is 10 km, the length of the entrance use slot had to be set taking account of the delay time period for up to 10 km. Thus, the line accommodation efficiency deteriorates.

SUMMARY OF THE INVENTION

An object of the present invention is to provide a PDS structured optical subscriber system that allows a optical subscriber unit to newly subscribe to the system with an entrance use slot whose length is almost a half of a conventional system.

According to a first aspect of the present invention, there is provided a Passive Double Star (PDS) structured optical subscriber system, which comprises: at least one center unit; a plurality of optical subscriber units; a downbound transmission path for transmitting a downbound optical signal from the center unit to the plurality of optical subscriber units; an upbound transmission path for transmitting upbound optical signals from the plurality of optical subscriber units to the center unit; a downbound star coupler for branching the downbound optical signal to the plurality of optical subscriber units; and an upbound star coupler for multiplexing the upbound optical signals from the plurality of optical subscriber units, wherein the center unit comprises: an optical burst signal receiving portion for receiving an upbound optical burst signal from the upbound star coupler; an optical power/delay time period converting portion for inputting the upbound optical burst signal from the optical burst signal receiving portion and converting a power of the upbound optical burst signal into a first delay time period; a response frame detecting portion for inputting the first delay time period from the optical power/delay time period converting portion and detecting a response frame so as to generate a frame detection signal; a delay coarsely-adjusting portion for inputting the frame detection signal from the response frame detecting portion and the upbound optical burst signal from the optical burst signal receiving portion and coarsely-adjusting a second delay time period on the basis of the frame detection signal and the upbound optical burst signal; a delay finely-adjusting portion for inputting the second delay time period from the delay coarsely-adjusting portion and the upbound optical burst signal from the optical burst signal receiving portion and finely-adjusting the second delay time period; a delay time period comparing portion for inputting the first delay time period from the optical power/delay time period converting portion and the second delay time period from the delay finely-adjusting portion and comparing the first and second delay time periods so as to generate a third delay time period which is set to be equal to the second delay time period in case where a difference between the first and second delay time periods is within tolerable range and so as not to generate the third delay time period in the other case; a timing generating portion for inputting the third delay time period signal from the delay time period comparing portion and generating a response timing for each of the plurality of subscriber units; and an optical burst signal transmitting portion for transmitting a first downbound optical burst signal every two frames, and transmitting a second downbound burst signal containing an information on the response timing to each of the plurality of optical subscriber units when inputting the response timing from the timing generating portion, to each of the plurality of optical subscriber units through the downbound star coupler, and wherein each of the plurality of optical subscriber units comprises: an optical burst signal receiving portion for receiving the first and second downbound optical burst signals from the center unit through the downbound star coupler; a received optical power calculating portion for inputting the first downbound optical burst signal from the burst signal receiving portion and estimating an installation distance corresponding to an optical power of the first downbound optical burst signal; a frame determining portion for inputting the estimated installation distance from the received optical power calculating portion and determining a frame in which inserted is the upbound optical burst signal to be transmitted to the center unit as a response to the first downbound optical burst signal; a timing generating portion for inputting the determined frame from the frame determining portion and generating a transmission timing when the upbound optical burst signal is transmitted from the optical subscriber unit; and an optical burst signal transmitting portion for inputting the transmission timing from the timing generating portion and outputting the upbound optical burst signal to the center unit through the upbound star coupler.

According to a second aspect of the present invention, there is provided a PDS structured optical subscriber system, which comprises: at least one center unit; a plurality of optical subscriber units; a downbound transmission path for transmitting a downbound signal from the center unit to the plurality of optical subscriber units; an upbound transmission path for transmitting upbound signals from the plurality of optical subscriber units to the center unit; a downbound star coupler for branching the downbound signal to the plurality of optical subscriber units; and an upbound star coupler for multiplexing the upbound signals from the plurality of optical subscriber units, wherein the time period of an entrance use slot is shorter than a turnaround time period of a signal transmitted through the maximum length of the upbound transmission path and the maximum length of the downbound transmission path.

According to a third aspect of the present invention, there is provided an optical subscriber unit used for a PDS structured optical subscribe system, which comprises: detecting means for detecting whether an installation distance of the optical subscriber unit is in a short distance range or a long distance range on the basis of a received optical power, when the optical subscriber unit receives an entrance command in a downbound transmission path from a center unit; and transmitting means for transmitting a response burst signal to an entrance use slot of the current frame in a upbound transmission path in case where the installation distance is in the short distance range and for transmitting response burst signal in an entrance use slot of the next frame in the upbound transmission path after a predetermined time period in case where the distance is in the long distance range.

According to a fourth aspect of the present invention, there is provided a center unit used for a PDS structured optical subscriber system, which comprises: first installation distance detecting means for detecting an installation distance of an optical subscriber unit by measuring a delay time period of a response burst signal transmitted from the optical subscriber unit against a subscriber command in a current entrance use slot throughout plural entrance use slots.

These and other objects, features and advantages of the present invention will become more apparent in light of the following detailed description of the best mode of embodiment thereof, as illustrated in the accompanying drawings.

DESCRIPTION OF PREFERRED EMBODIMENT

Next, with reference to the accompanying drawings, the embodiment of the present invention will be explained.

Figure 1:
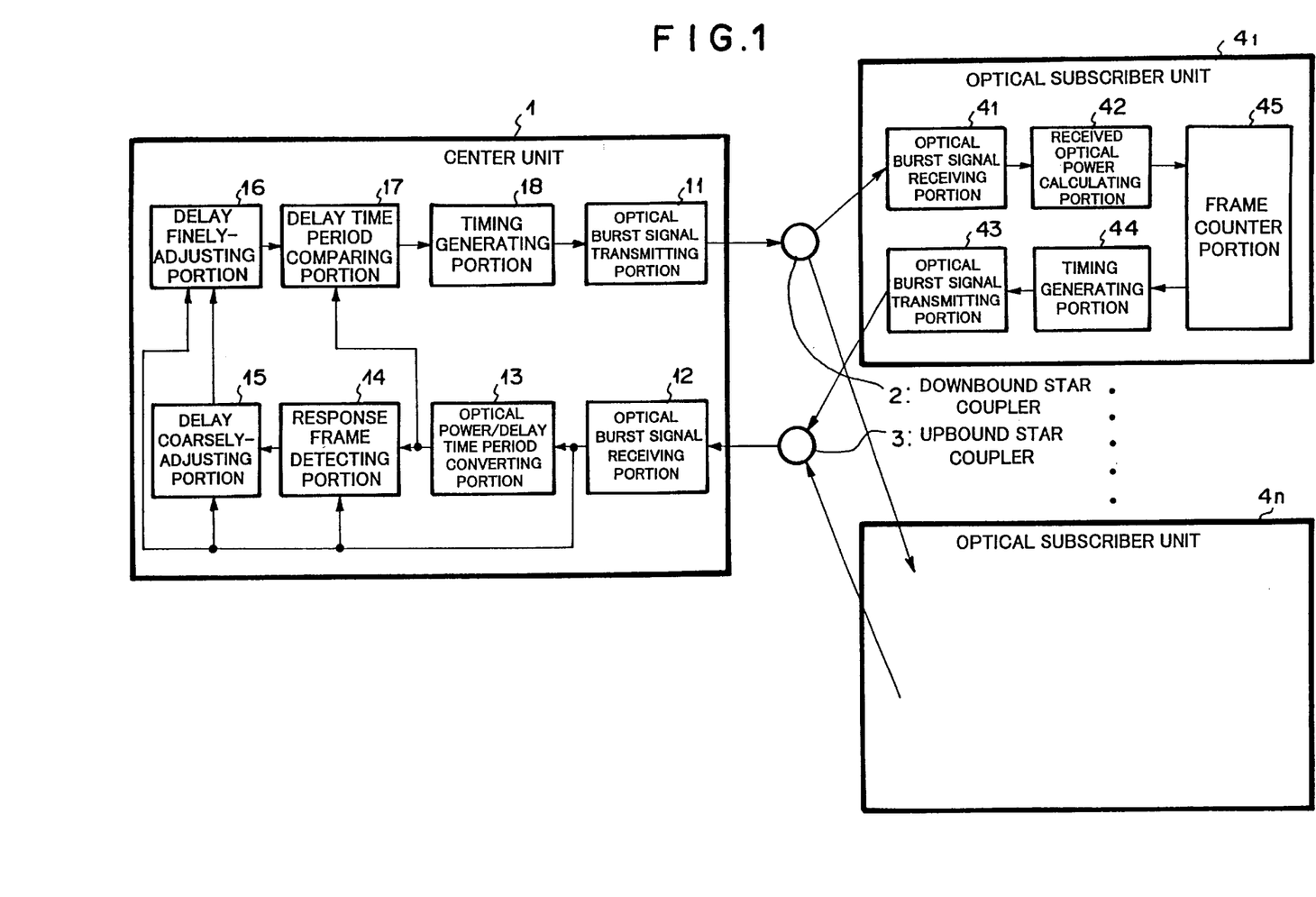
FIG. 1 is a block diagram showing the structure of a PDS structured optical transmission system according to embodiment of the present invention.

In FIG. 1, a PDS structured optical transmission system according to the embodiment of the present invention comprises center unit 1, optical subscriber units $4_1$ to $4_n$, of which the number is N, where N is any integer larger than 0, downbound star coupler 2, and upbound star coupler 3. Downbound star coupler 2 connects center unit 1 with optical subscriber units $4_1$ to $4_n$. Upbound star coupler 3 connects optical subscriber units $4_1$ to $4_n$ with center unit 1.

Center unit 1 comprises optical burst signal receiving portion 12, optical power/delay time period converting portion 13, response frame detecting portion 14, delay coarsely-adjusting portion 15, delay finely-adjusting portion 16, delay time period comparing portion 17, timing generating portion 18, and optical burst signal transmitting portion 11. Optical burst signal receiving portion 12 inputs an optical signal from upbound star coupler 3. Optical power/delay time period converting portion 13 inputs the optical signal from optical burst signal receiving portion 12 and converts an optical power of the optical signal into a first delay time period. Response frame detecting portion 14 inputs a signal from optical power/delay time period converting portion 13 and detects a response frame. Delay coarsely-adjusting portion 15 inputs a signal from response frame detecting portion 14 and coarsely adjusts a second delay time period. Delay finely-adjusting portion 16 inputs the second delay time period from delay coarsely-adjusting portion 15 and finely adjusts the second delay time period. Delay time period comparing portion 17 inputs the first delay time period from optical power/delay time period converting portion 13 and the second delay time period from delay finely-adjusting portion 16 and compares the first and second delay time periods. Timing generating portion 18 inputs the second delay time period from delay time period comparing portion 17 and generates a response timing for each of optical subscriber units $4_1$ to $4_n$. Optical burst signal transmitting portion 11 inputs a signal representing the response timing from timing generating portion 18 and outputs response timing data to optical subscriber units $4_1$ to $4_n$ through downbound star coupler 2.

On the other hand, each of optical subscriber units $4_1$ to $4_n$ comprises optical burst signal receiving portion 41, received optical power calculating portion 42, frame counter portion 45, timing generating portion 44, and optical burst signal transmitting portion 43. Optical burst signal receiving portion 41 inputs an optical burst signal from center unit 1 through downbound star coupler 2. Received optical power calculating portion 42 inputs a signal from optical burst signal receiving portion 41 and calculates the installation distance of local optical subscriber unit corresponding to the optical power. Frame counter portion 45 inputs a signal from received optical power calculating portion 42 and counts an insertion timing of the entrance use slot of the upbound frame format. Timing generating portion 44 inputs a signal from frame counter portion 45. Optical burst signal transmitting portion 43 inputs a signal from frame counter portion 45 and outputs optical burst signal to center unit 1 through upbound star coupler 3.

Figure 2A:
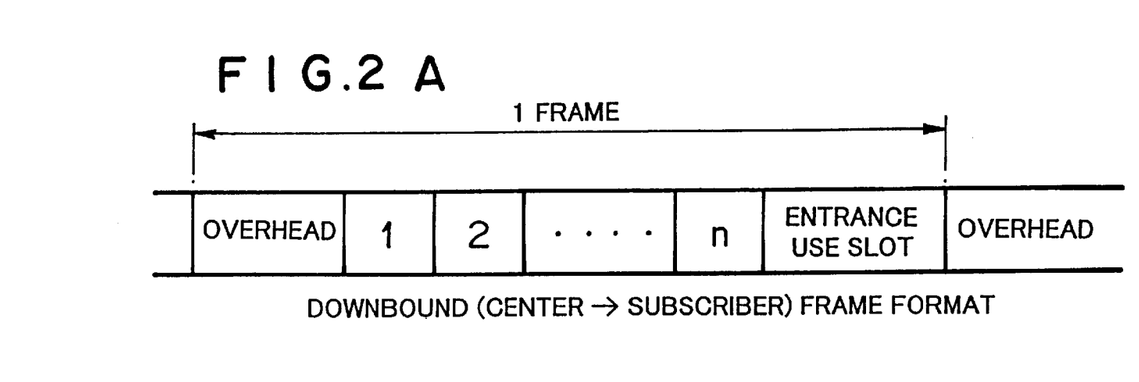
FIGS. 2A and 2B are schematic diagrams showing frame formats of the PDS structured optical transmission system according to the embodiment of the present invention.
Figure 2B:
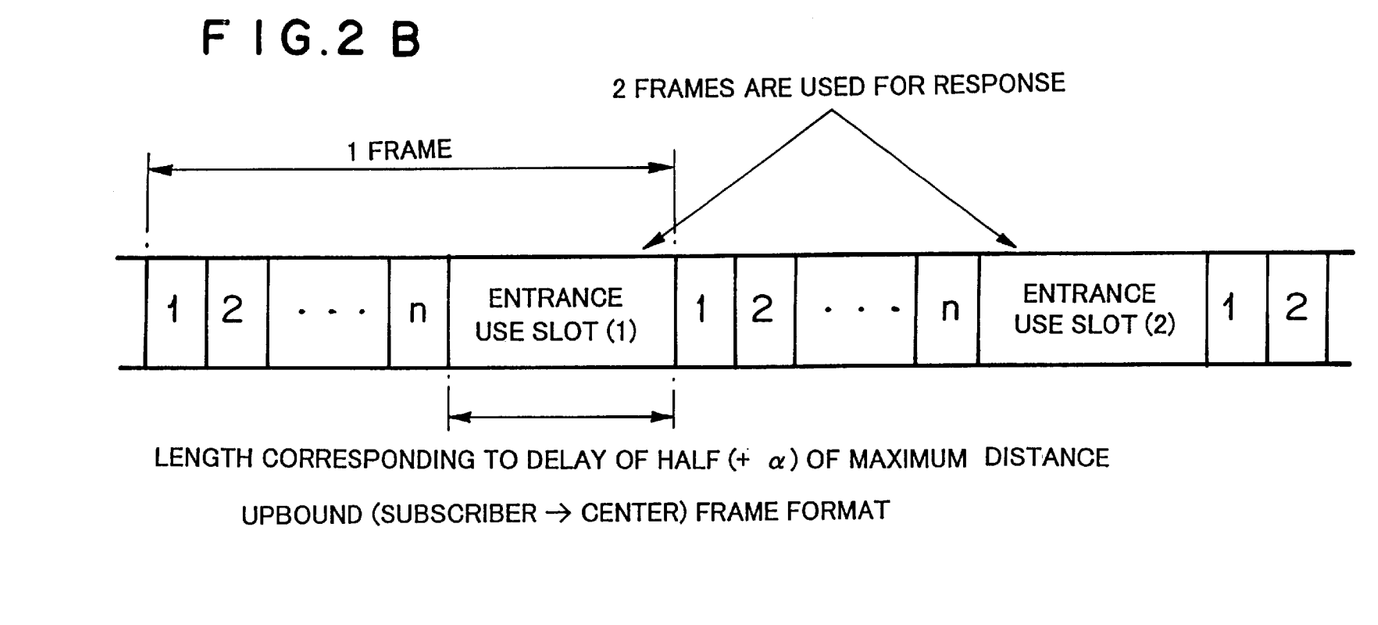

Next, a method in which each of optical subscriber units $4_1$ to $4_n$ newly subscribes to the optical transmission system will be explained. FIGS. 2A and 2B are schematic diagrams showing frame formats for explaining features of the present invention.

Explanation will be made on a case where optical subscriber unit $4_m$, where m is a natural number that satisfies the relation m>n≧0, newly subscribes to the optical system. Center unit 1 transmits an entrance command to the entrance use slot of a downbound frame format shown in FIG. 2A once every two frames. Optical burst signal receiving portion 41 of optical subscriber unit $4_m$ receives the entrance command. The received entrance command is inputted to received optical power calculating portion 42. Received optical power calculating portion 42 estimates the distance between local optical subscriber unit $4_m$ and center unit 1 corresponding to the received optical power. Estimated value is inputted to frame counter portion 45.

When the estimated value is larger than L/2+α, where L is the maximum allowable installation distance, frame counter portion 45 sets frame counter information so that a response burst signal is placed in the entrance use slot (2) of the next frame in a upbound frame format shown in FIG. 2B rather than the entrance use slot (1) of the current frame in the upbound frame format, or more precisely, after delaying a period of from the end of the current entrance use slot (1) to the beginning of the next entrance use slot (2). Timing generating portion 44 sets an output timing corresponding to the frame counter information so that response burst signal is placed in the next entrance use slot (2) rather than the current entrance use slot (1). Optical burst signal transmitting portion 43 transmits the response burst signal to center unit 1 at the output timing.

In this case, the value of a is given as follow:

$$\alpha = L \times B / A,$$

where A is a difference between the level of the transmission signal at center unit 1 and the level of the reception signal at optical subscriber unit $4_m$; B is a system margin corresponding to the difference A; and L is as mentioned above.

In other words, when optical subscriber unit $4_m$ does not respond to center unit 1 in the first frame and responds to center unit 1 at the next frame with a delay time period corresponding to the distance L/2, the actual installation distance must be definitely L/2 or more Therefore, the allowable range is within the system margin between the relevant units.

On the other hand, optical burst signal receiving portion 12 of center unit 1 receives the response burst signal through upbound star coupler 3. Optical power/delay time period converting portion 13 converts the optical power into an estimated value of the delay time period and outputs the estimated value of the delay time period to response frame detecting portion 14 and delay time period comparing portion 17, when the response burst signal is detected. Response frame detecting portion 14 detects the response burst signal from optical subscriber unit $4_m$ by judging whether an effective estimated value of the delay time is inputted. When the first entrance use slot (1) does not have the response burst signal, response frame detecting portion 14 confirms whether the response burst signal is in the next entrance use slot (2) so as to output information on which entrance use slot have the response burst signal to the delay coarsely-adjusting portion 15. The information concerning the entrance use slot represents whether response burst signal has been detected in the first frame or the next frame or response burst signal has not been detected.

When the first frame (1) does not have the response burst signal, delay coarsely-adjusting portion 15 temporarily stops the operation of the counter which started at the beginning of the first frame (1). After response frame detecting portion 14 has detected response burst signal in the next frame, delay coarsely-adjusting portion 15 resumes the operation of the counter and estimates the delay time period.

The estimated value is inputted to delay finely-adjusting portion 16 which then finely adjusts the delay time period in the vicinity of the estimated value. When the delay finely-adjusting portion 16 finely adjusts the delay time period, another burst signal is transmitted back and forth between center unit 1 and optical subscriber unit $4_m$. Delay time period comparing portion 17 compares the finely adjusted delay time period inputted from delay finely-adjusting portion 16 with the estimated delay time period inputted from optical power/delay time period converting portion 13. When the difference between the finely adjusted delay time period and the estimated delay time period is within an allowable range corresponding to a system margin, the finely adjusted delay time period is inputted to timing generating portion 18. Timing generating portion 18 generates data of a response timing for optical subscriber unit $4_m$. Optical burst signal transmitting portion 11 transmits the data of a response timing to optical subscriber unit $4_m$.

Delay coarse adjusting coarsely-adjusting portion 15 and delay fine adjusting finely-adjusting portion 16 are separately provided because of a limit of the number of bits of a counter for adjustment and may be unified into a single delay adjusting portion having a large number of bits of the counter and adjusting a delay time period at a time.

Alternatively, the delay adjusting portion may detect a delay time period of the response burst signal bridging two entrance use slots without using the frame position detected by response frame detecting portion 14. As explained above, the delay adjusting portion resets a counter, when optical burst signal transmitting portion 11 transmits a burst signal which is a entrance command to an entrance use slot and measures a delay time of the optical burst signal by making reference to a count of the counter when the optical burst signal is received by optical burst signal receiving portion 12. However, in this case, when the current entrance use slot does not have response burst signal, the delay adjusting portion temporarily stops the operation of the counter at the end of the current entrance use slot and resume the operation of the counter at the beginning of the next entrance use slot. When the next entrance use slot has response burst signal, the delay adjusting portion can measure the delay time period corresponding to the count value that has been counted. Thus, even if the next entrance use slot has response burst signal, the delay adjusting portion can detect the installation distance between center unit 1 and optical subscriber unit $4_m$ that newly subscribes to the system.

As explained above, the length of the entrance use slot can be shortened by using plural entrance use slots for measureing the turnaround delay time of the burst signal.

Figure 3:
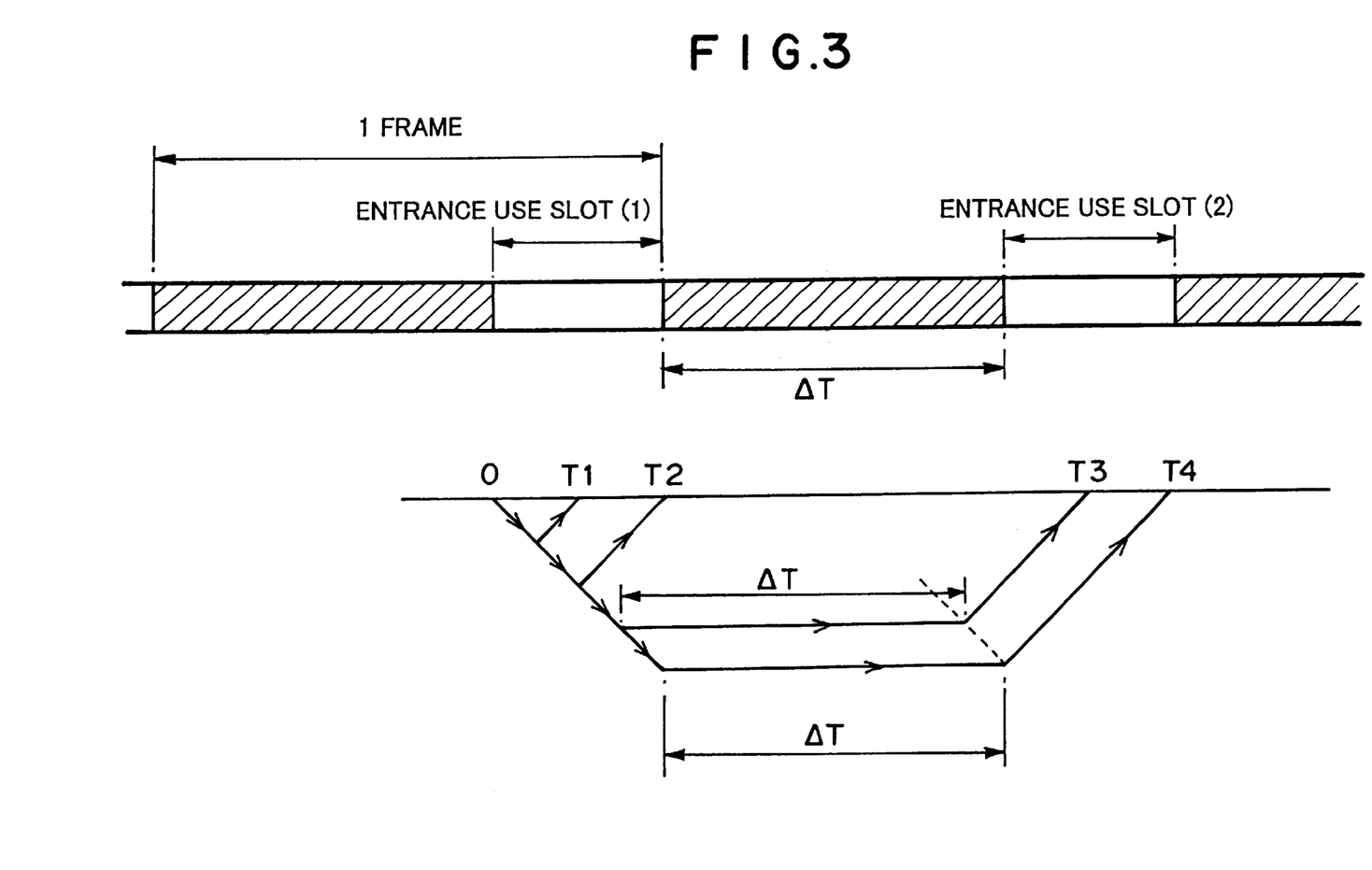
FIG. 3 is a schematic diagram for explaining a method for measuring a delay time period according to the embodiment of the present invention.

FIG. 3 is a schematic diagram for explaining a method for measuring a delay time period. In FIG. 3, time periods T1 and T2 are delay time periods of a response burst signal in a case where an installation distance is shorter than L/2+α and the response burst signal is placed in the entrance use slot (1). In this case, each of the measured time periods T1 and T2 is used as a delay time corresponding to the installation distance. Time periods T3 and T4 are delay time periods of a response burst signal in a case where an installation distance is L/2+α or more and the response burst signal is placed in the entrance use slot (2). In this case, since the response timing is delayed by a time period ΔT in subscriber unit $4_m$, the result of subtracting the ΔT from the measured time period T3 or T4 can be used as a delay time corresponding to the installation distance.

When an installation distance is incorrectly calculated due to a defect in an optical transmission path and so forth and a delay time corresponding to the incorrect installation distance is set to a new subscriber unit, a signal transmitted from a new optical subscriber unit may collide with signals from already existing subscriber units. In order to prevent this situation, if the estimated value of the delay time period obtained by converting the level of the optical power received by center unit 1 is largely different from the delay time period adjusted by the delay adjusting portion, center unit 1 judges that there is a defect in the optical transmission path and then cancels the subscription of the new optical subscriber unit. Thus, the system can be prevented from being destroyed and the current services on the system can be ensured.

As explained above, according to the present invention, since plural entrance use slots are used if the installation distance of an optical subscriber unit is long, the length of the entrance use slot can be approximately halved as compared with the conventional system.

Although the present invention has been shown and explained with respect to the best mode of embodiment thereof, it should be understood by those skilled in the art that the foregoing and various other changes, omissions, and additions in the form and detail thereof may be made therein without departing from the spirit and scope of the present invention.

What is claimed is:

1. A Passive Double Star (PDS) structured optical subscriber system, which comprises:

at least one center unit;

a plurality of optical subscriber units;

a downbound transmission path for transmitting a downbound optical signal from said center unit to said plurality of optical subscriber units;

an upbound transmission path for transmitting upbound optical signals from said plurality of optical subscriber units to said center unit;

a downbound star coupler for branching the downbound optical signal to said plurality of optical subscriber units; and an upbound star coupler for multiplexing the upbound optical signals from said plurality of optical subscriber units, wherein said center unit comprises:

an optical burst signal receiving portion for receiving an upbound optical burst signal from said upbound star coupler;

an optical power/delay time period converting portion for inputting the upbound optical burst signal from said optical burst signal receiving portion and converting a power of the upbound optical burst signal into a first delay time period;

a response frame detecting portion for inputting the first delay time period from said optical power/delay time period converting portion and detecting a response frame so as to generate a frame detection signal;

a delay coarsely-adjusting portion for inputting the frame detection signal from said response frame detecting portion and the upbound optical burst signal from said optical burst signal receiving portion and coarsely-adjusting a second delay time period on the basis of the frame detection signal and the upbound optical burst signal;

a delay finely-adjusting portion for inputting the second delay time period from said delay coarsely-adjusting portion and the upbound optical burst signal from said optical burst signal receiving portion and finely-adjusting the second delay time period;

a delay time period comparing portion for inputting the first delay time period from said optical power/delay time period converting portion and the second delay time period from said delay finely-adjusting portion and comparing the first and second delay time periods so as to generate a third delay time period which is set to be equal to the second delay time period in case where a difference between said first and second delay time periods is within tolerable range and so as not to generate the third delay time period in the other case;

a timing generating portion for inputting the third delay time period signal from said delay time period comparing portion and generating a response timing for each of said plurality of subscriber units; and an optical burst signal transmitting portion for transmitting a first downbound optical burst signal every two frames, and transmitting a second downbound burst signal containing an information on the response timing to each of said plurality of optical subscriber units when inputting the response timing from said timing generating portion, to each of said plurality of optical subscriber units through said downbound star coupler, and wherein each of said plurality of optical subscriber units comprises:

an optical burst signal receiving portion for receiving the first and second downbound optical burst signals from said center unit through said downbound star coupler;

a received-optical power calculating portion for inputting the first downbound optical burst signal from said burst signal receiving portion and estimating an installation distance corresponding to an optical power of the first downbound optical burst signal;

a frame determining portion for inputting the estimated installation distance from said received optical power calculating portion and determining a frame in which inserted is the upbound optical burst signal to be transmitted to said center unit as a response to the first downbound optical burst signal;

a timing generating portion for inputting the determined frame from said frame determining portion and generating a transmission timing when the upbound optical burst signal is transmitted from said optical subscriber unit; and an optical burst signal transmitting portion for inputting the transmission timing from said timing generating portion and outputting the upbound optical burst signal to said center unit through said upbound star coupler.

2. A PDS structured optical subscriber system, which comprises:

at least one center unit, having an optical power/delay time period converting portion for converting a power of a burst signal into a delay time period;

a plurality of optical subscriber units;

a downbound transmission path for transmitting a downbound optical signal from said center unit to said plurality of optical subscriber units;

an upbound transmission path for transmitting upbound optical signals from said plurality of optical subscriber units to said center unit;

a downbound star coupler for branching the downbound optical signal to said plurality of optical subscriber units; and an upbound star coupler for multiplexing the upbound optical signal from said plurality of optical subscriber units, wherein the time period of an entrance use slot is shorter than a turnaround time period of an optical signal transmitted through the maximum length of said upbound transmission path and the maximum length of said downbound transmission path.

3. The PDS structured optical subscriber system as set forth in claim 2, wherein the time period of the entrance use slot is around half of the turnaround time period of the signal transmitted through the maximum length of said upbound transmission path and the maximum length of said downbound transmission path.

4. An optical subscriber unit used for a passive double star (PDS) structured optical subscribe system, which comprises:

detecting means for detecting whether an installation distance of the optical subscriber unit is in a short distance range or in a long distance range on the basis of a received optical power when the optical subscriber unit receives an entrance command in a downbound transmission path from a center unit; and transmitting means for transmitting a response burst signal to an entrance use slot of the current frame in a upbound transmission path in case where the installation distance is in the short distance range and for transmitting the response burst signal in an entrance use slot of the next frame in the upbound transmission path after a predetermined time period in case where the distance is in the long distance range.

5. The optical subscriber unit as set forth in claim 4, wherein the short distance range is around a half of or shorter than the maximum length of a transmission path of the PDS structured optical subscriber system, and wherein the long distance range is longer than around a half of the maximum length of the transmission path of the PDS structured optical subscriber system.

6. The optical subscriber unit as set forth in claim 4, wherein the predetermined time period is a time period of from the end of the current entrance use slot to the beginning of the next entrance use slot.

7. A center unit used for a passive double star (PDS) structured optical subscriber system, comprising:

first installation distance detecting means for detecting an installation distance of an optical subscriber unit by measuring a delay time period of a response burst signal transmitted from the optical subscriber unit against a subscriber command inserted in a downbound current entrance use slot, wherein the detection of the installation distance is executed throughout plural upbound entrance use slots;

response timing calculating means for calculating a response timing of the optical subscriber unit corresponding to an output of said first installation distance detecting means;

transmitting means for transmitting data of the response timing to the optical subscriber unit;

second installation distance detecting means for detecting the installation distance of the optical subscriber unit on the basis of a received optical power of the response burst signal from the optical subscriber unit;

defect detecting means for detecting a defect in a transmission path by comparing an output of said first installation distance detecting means and an output of said second installation distance detecting means; and transmission canceling means for canceling the transmission of data of the response timing when said defect detecting means has detected a defect of the transmission path.

* * * * *